(12) United States Patent
Zerphy et al.

(10) Patent No.: US 7,053,862 B2
(45) Date of Patent: May 30, 2006

(54) SYSTEM AND METHOD FOR RAPIDLY REFRESHING A DYNAMIC MESSAGE SIGN DISPLAY PANEL

(76) Inventors: Bryron L. Zerphy, 6266 Sauterne Dr., Macungle, PA (US) 18062; Eric J. Zerphy, 3175 Watermill Dr., Macungle, PA (US) 18062

( * ) Notice: Subject to any disclaimer, the term of this patent is extended or adjusted under 35 U.S.C. 154(b) by 12 days.

(21) Appl. No.: 10/752,833

(22) Filed: Jan. 6, 2004

(65) Prior Publication Data

US 2005/0146530 A1 Jul. 7, 2005

Related U.S. Application Data

(63) Continuation-in-part of application No. 10/748,171, filed on Dec. 31, 2003.

(51) Int. Cl.
*G09G 5/00* (2006.01)

(52) U.S. Cl. .......................... 345/1.1; 345/1.2; 345/1.3

(58) Field of Classification Search ................ 345/558, 345/530, 545, 564, 502, 1.1–1.3, 520, 501
See application file for complete search history.

(56) References Cited

U.S. PATENT DOCUMENTS

| | | | | |
|---|---|---|---|---|
| 4,642,794 A | * | 2/1987 | Lavelle et al. ............... | 345/686 |
| 5,796,376 A | * | 8/1998 | Banks ......................... | 345/82 |
| 5,914,698 A | | 6/1999 | Nicholson et al. ............. | 345/1 |
| 5,949,581 A | | 9/1999 | Kurtenbach et al. ........ | 359/621 |
| 5,986,622 A | * | 11/1999 | Ong ............................ | 345/1.1 |
| 6,002,411 A | * | 12/1999 | Dye ........................... | 345/542 |
| 6,150,996 A | | 11/2000 | Nicholson et al. ............. | 345/1 |
| 6,169,632 B1 | | 1/2001 | Kurtenbach et al. ........ | 359/621 |
| 6,175,342 B1 | | 1/2001 | Nicholson et al. ............. | 345/1 |
| 6,314,669 B1 | | 11/2001 | Tucker ......................... | 40/448 |
| 6,379,209 B1 | | 4/2002 | Tucker ......................... | 445/24 |
| 6,414,650 B1 | | 7/2002 | Nicholson et al. ............. | 345/1 |
| 2001/0037591 A1 | | 11/2001 | Nicholson et al. | |
| 2002/0118144 A1 | * | 8/2002 | Edmonds ...................... | 345/1.1 |
| 2003/0206228 A1 | * | 11/2003 | Trevers et al. ........... | 348/14.01 |

OTHER PUBLICATIONS

Solar Technology, Inc., "Silent Messenger SOL-R-Sign™ Solar Powered Portable Changeable Message Sign Full Matrix Display—Version 9.3e, Operation & Maintenance Manual (P/N 550-024-100)," 84 pages, Feb. 2, 2000.

Solar Technology, Inc., "Specifications for Solar Powered Portable Changeable Message Sign," 6 pages, Mar. 10, 2001.

Solar Technology, Inc., "SolarTech Silent Messenger" (publication brochure No. 500-024-010/99), Oct. 1999.

(Continued)

*Primary Examiner*—Kee M. Tung
*Assistant Examiner*—Joni Hsu
(74) *Attorney, Agent, or Firm*—Finnegan, Henderson, Farabow, Garrett & Dunner L.L.P.

(57) ABSTRACT

In accordance with the invention, there is described systems and methods for rapidly refreshing a sign display panel. Each display unit of the sign display panel receives a plurality of frames from the controller and stores each frame in memory. The controller then sends a plurality of display instructions. Upon receiving each display instruction, each display unit processes a frame from memory to update the display output device.

19 Claims, 9 Drawing Sheets

OTHER PUBLICATIONS

Co-pending U.S. Appl. No. 10/748,171, Dynamic Message Sign Display Panel Communication Error Detection and Correction; filed Dec. 31, 2003.

Co-pending U.S. Appl. No. 10/751,527, Automatic Detection of Dynamic Message Sign Display Panel Configuration; Filed Jan. 6, 2004.

* cited by examiner

SYSTEM AND METHOD FOR RAPIDLY REFRESHING A DYNAMIC MESSAGE SIGN DISPLAY PANEL

CROSS-REFERENCE TO RELATED APPLICATION

This application is a continuation-in-part of application Ser. No. 10/748,171 filed Dec. 31, 2003.

FIELD OF THE INVENTION

The present invention relates to sign display panel communication. More particularly, the present invention relates to systems and methods for rapidly refreshing a dynamic message sign display panel.

BACKGROUND OF THE INVENTION

A dynamic message sign is a sign having a message that can be changed by a user. Dynamic message signs can be used to publicly display information that can be changed. For example, dynamic message signs can be used as roadway signs to alert motorists of traffic information or they can be used as commercial signs to advertise business or product information. Dynamic message signs are typically connected to a controller for controlling the message on the sign's display. A controller is typically a computer having a communication interface for communicating with the sign.

Dynamic message signs can also be made up of multiple display units, each of which are responsible for producing part of the sign's display. In a dynamic message sign having multiple display units, the controller must communicate with each display unit in order to refresh the display.

In order to refresh the display, the controller must first send display data, or frames, to each display unit before the display can be refreshed. Sending the frames from the controller prior to refreshing the display is cumbersome and causes unnecessary delay.

SUMMARY OF THE INVENTION

In accordance with the invention, there is described systems and methods for rapidly refreshing a sign display panel. Each display unit of the sign display panel receives a plurality of frames from the controller and stores each frame in memory. The controller then sends a plurality of display instructions. Upon receiving each display instruction, each display unit processes a frame from memory to update the display output device. In one embodiment, the memory is a FIFO and the frames are processed in the same order in which they are received.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

According to the present invention there is disclosed systems and methods for error detection and correction in a sign communication system. A dynamic message sign display panel includes at least one display unit controlled by a controller. The controller sends a variety of messages to each of the display units. Each display unit can check each message for communication errors and also indicate whether there is a break in the communication network. Furthermore, in one embodiment, the controller can detect which display unit detected an error in the message or in the communication network.

Figure 1:
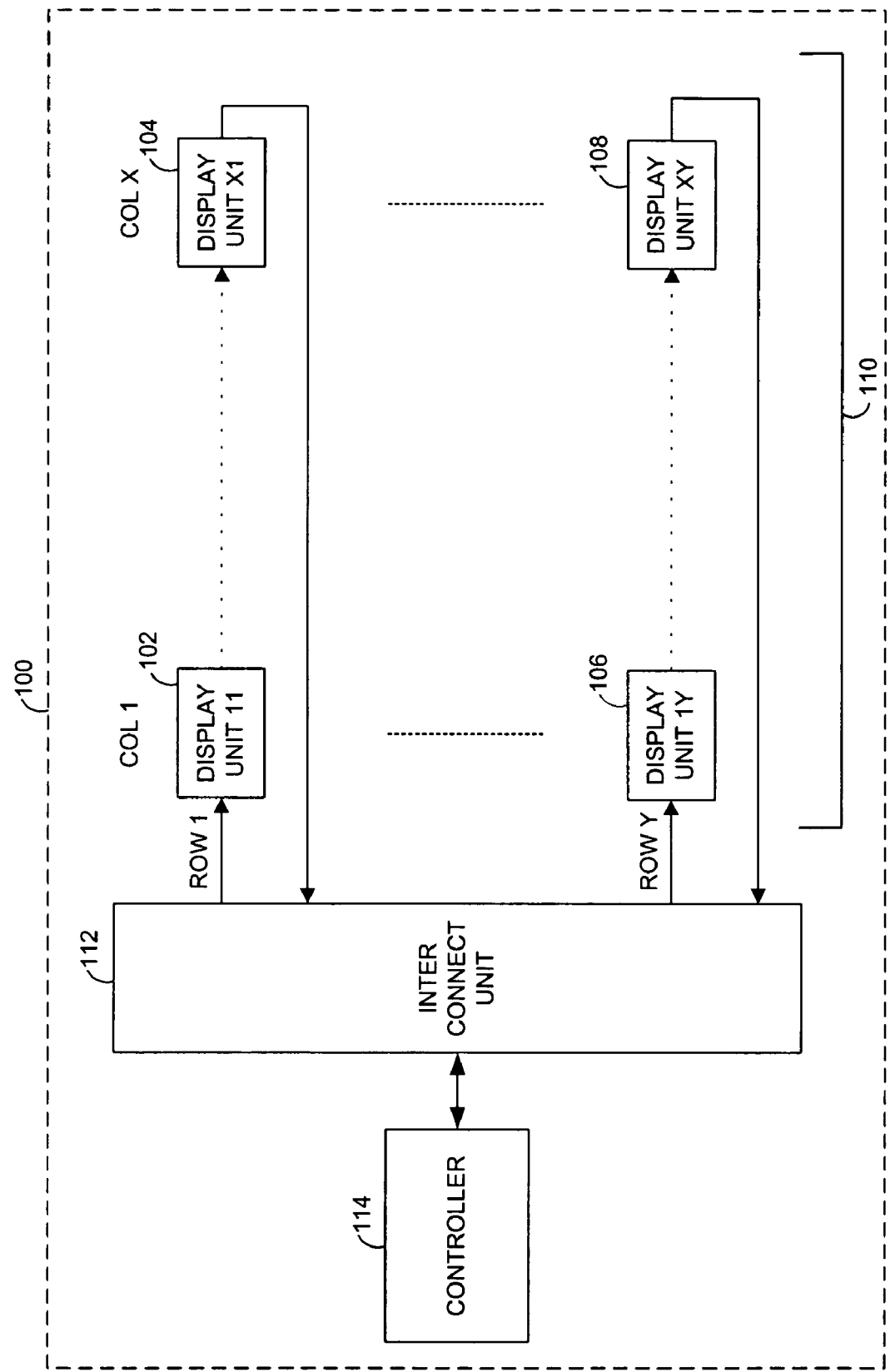
FIG. 1 depicts a block diagram of an exemplary dynamic message sign display panel, in accordance with systems and methods consistent with the present invention.

Referring to FIG. 1, there is shown a block diagram of an exemplary dynamic message sign display panel 100, in accordance with systems and methods consistent with the present invention. Sign display panel 100 is made up of a controller 114, a plurality of display units 110, and an interconnect unit 112. Each of the display units 110 is responsible for producing patterns on a portion of the sign display panel 100. In this embodiment, display units 110 are arranged in a matrix having X number of columns and Y number of rows. Display units 110 can be arranged in other configurations and quantities as is understood by those of skill in the art. The number of columns X and rows Y of the matrix depends upon the size of the sign display panel 100.

FIG. 1 depicts a display unit 102 in row 1 column 1, a display unit 104 in row 1 column X, a display unit 106 in row Y column 1, and a display unit 108 in row Y column X.

Display units 110 are controlled by controller 114. Controller 114 sends messages to and receives response messages providing feedback from display units 110. In alternative embodiments, controller 114 may double as a display unit and may also be responsible for displaying a portion of the sign. Controller 114 supplies power and data signals to display units 110 and receives data signals from display units 110 through interconnect unit 112. Controller 114 can be connected to interconnect 112 by any suitable means for transmitting power and digital data such as cable or copper wire.

Figure 2:
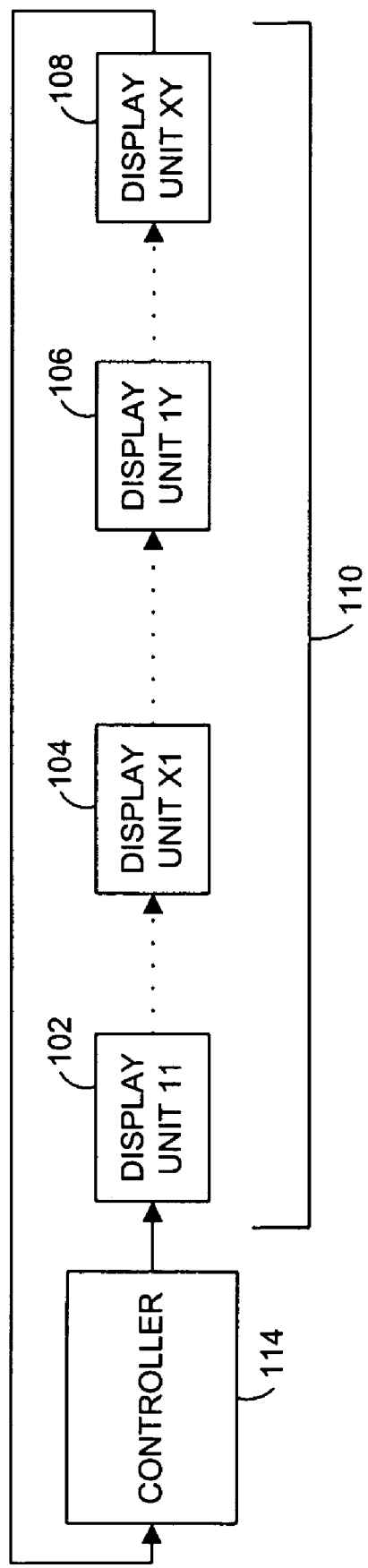
FIG. 2 depicts a block diagram of an exemplary communication network for a dynamic message sign display panel, in accordance with systems and methods consistent with the present invention.

FIG. 2 depicts a block diagram of an exemplary communication network for a dynamic sign display panel, in accordance with systems and methods consistent with the present invention. FIG. 2 depicts each of the display units 110 and the controller 114 of FIG. 1 as they are connected in the communication network. Controller 114 and display units 110 communicate with each other in a directional ring. Accordingly, controller 114 sends information to display unit 102 in row 1 column 1 and receives information from display unit 108 in row X column Y. Each display unit receives information from the display unit in the previous column and sends information to the display unit in the next column. The final display unit in a row sends information to the first display unit in the following row. Thus, display unit 104 in row 1 column X sends information to the display unit in row 2 column 1 (not shown). Similarly, display unit 106 in column 1 row Y receives information from the display unit in column X of the previous row (not shown) and sends information to the display unit in column 2 row Y (not shown). Finally, display unit 108 in column X row Y receives information from the display unit in the previous column of row Y (not shown) and sends information back to controller 114. In this embodiment, information is sent serially through the network from the controller 114 to each of the display units 110. Other embodiment can include networks that send information in parallel. Display units 110 can be connected to each other by any suitable means for transmitting power and/or digital data such as cable or copper wire.

Figure 3A:
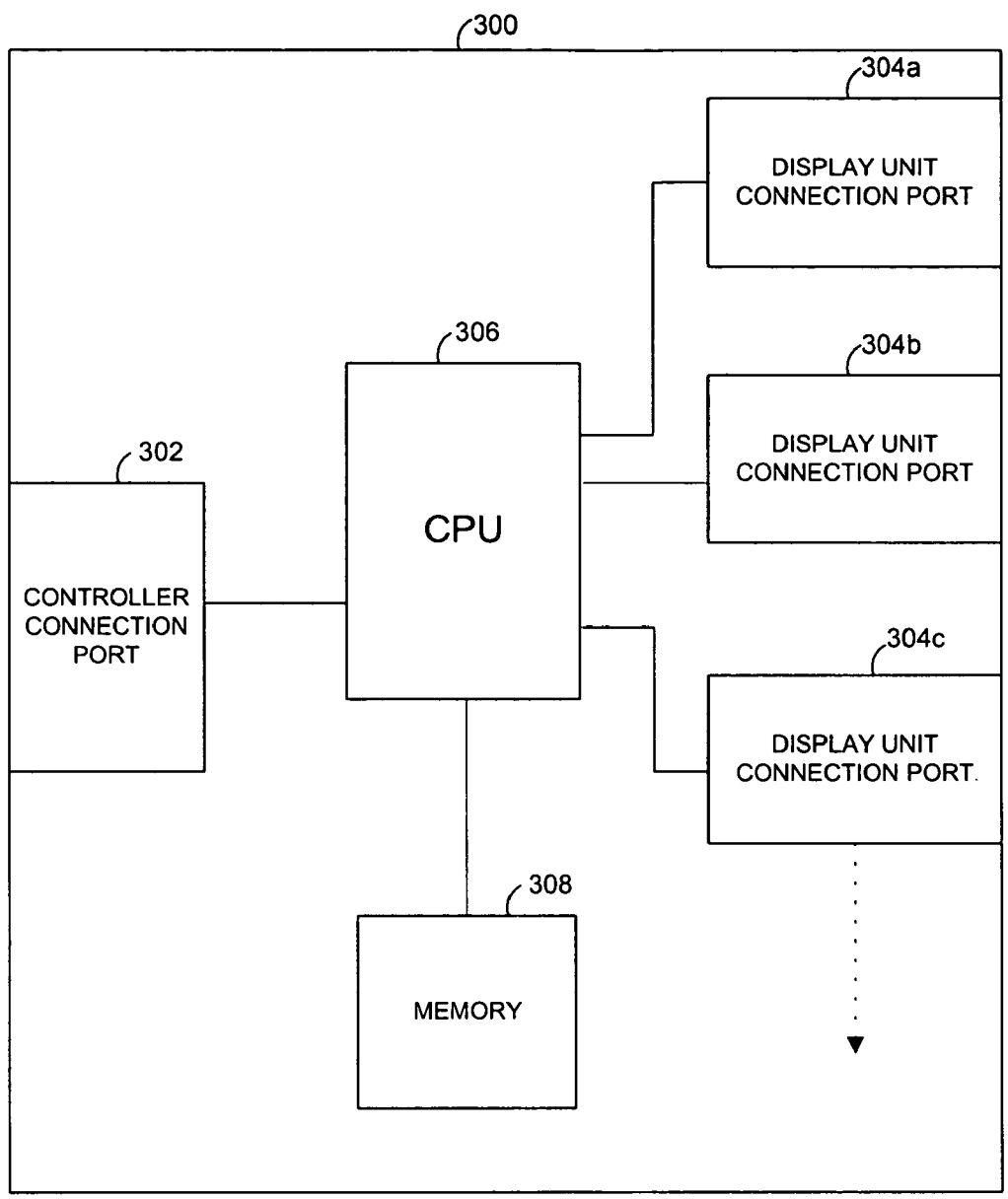
FIG. 3A depicts a block diagram of an exemplary interconnect unit, in accordance with systems and methods consistent with the present invention.

FIG. 3A depicts the exemplary interconnect 112 of FIG. 1 in greater detail. The interconnect unit includes a printed circuit board 300 that includes a controller connection port 302 for receiving power and data from controller 114 (FIG. 1), and for sending data to controller 114. Circuit board 300 also includes a central processing unit (CPU) 306, a memory 308, and a set of display unit connection ports 304a–304c. In one embodiment, CPU 306 and memory 308 can be combined in a single integrated circuit such as a microcontroller. Each of the display unit connection ports 304a–304c can provide power to a corresponding row of display units (not shown), provide data to the display unit in the first column of the row, and receive data from the display unit in the last column of the row. Each row of display units is connected to a corresponding display unit connection port through a connector (not shown), which may be any suitable means for transmitting power and/or digital data such as cable, copper wire, fiber optic lines, or a wireless network. An example of such a connector is Molex Compodre, which is known and commercially available. Each display unit connection port includes a sensor for detecting the presence of a connector.

Figure 3B:
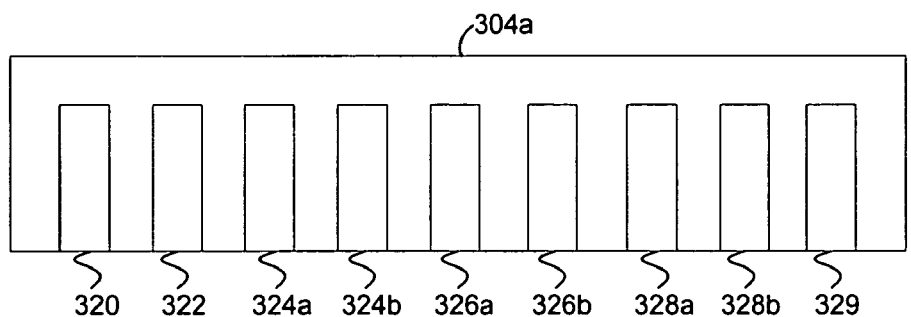
FIG. 3B depicts a block diagram of an exemplary display unit connection port, in accordance with systems and methods consistent with the present invention.

FIG. 3B depicts a block diagram of an exemplary display unit connection port, in accordance with systems and methods consistent with the present invention. In this embodiment, a display unit connection port (e.g. port 304a–304c) comprises two pins 320 and 322 for distributing power to the row of display units, two pins 324a and 324b for sending data to the display unit in the first column, two pins 326a and 326b for receiving data from the display unit in the last column, two pins 328a and 328b for closing a switch to indicate the presence of a connector (not shown) that connects display unit connection port 304a to a row of display units, and one pin 329 for system reset. The system reset pin 329 provides a means for the controller to issue a restart command to each display unit in the row of display units independent of the communication network. In this embodiment, the two pins 328a and 328b, which close the switch, act as the sensor for the connection port 304a. Alternative sensors, such as a pressure sensor, can be used as is understood by one of skill in the art.

Referring to FIG. 3A, CPU 306 executes instructions associated with interconnect software stored in memory 308. The interconnect software includes instructions for polling each of the connection ports (304a–304c) to determine the presence of a connector at any of the connection ports 304a–304c. For example, if pins 328a and 328b (FIG. 3B) have closed the switch, the interconnect software recognizes that a connector has been connected to connection port 304a. The interconnect software can send the results to the controller through the controller connection port 302. As described below, the interconnect software may also determine the total number of display units and, therefore, the configuration of the sign.

Figure 4:
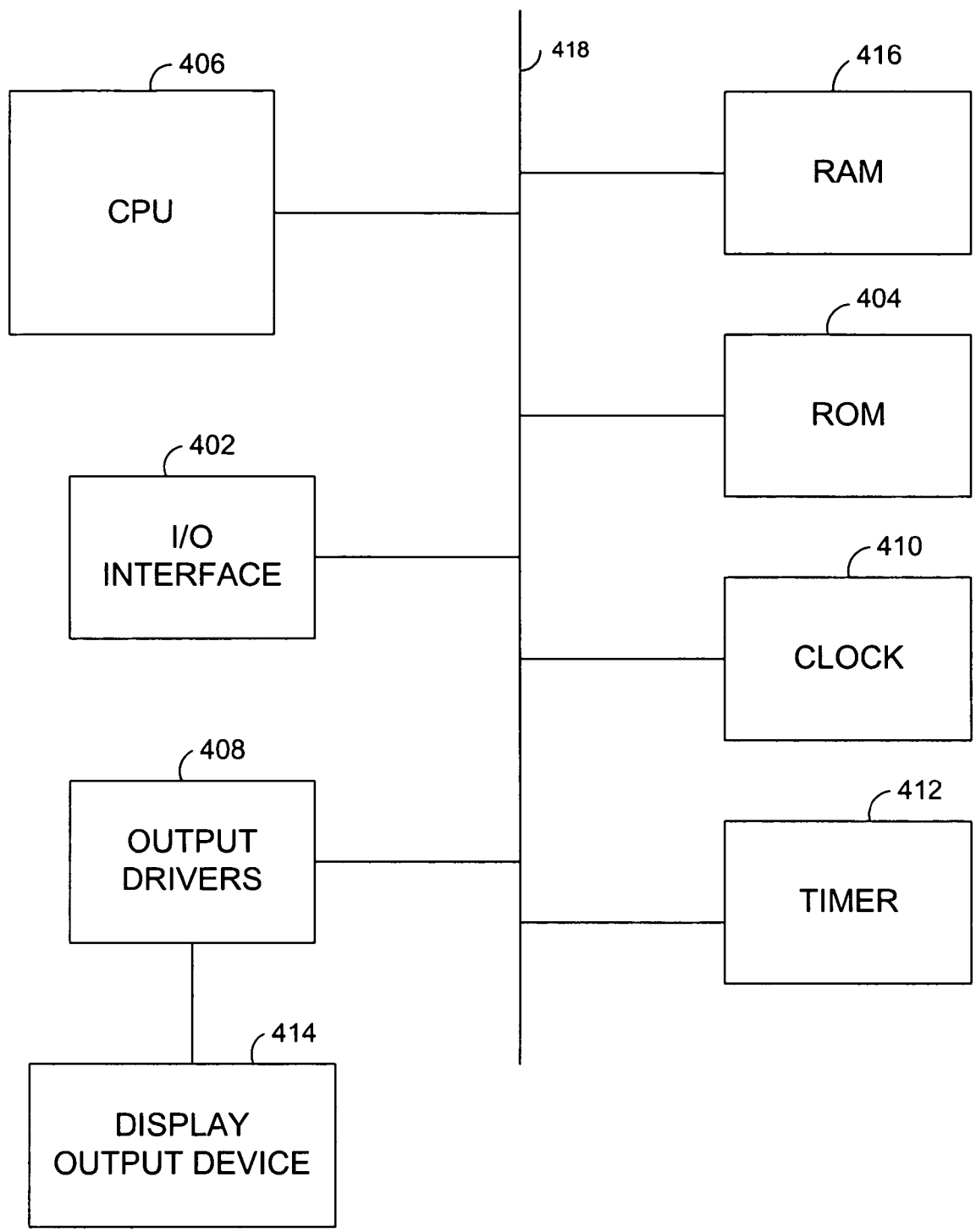
FIG. 4 depicts a block diagram of an exemplary display unit for use in a display panel, in accordance with systems and methods consistent with the present invention.

FIG. 4 depicts a block diagram of an exemplary display unit for use in a display panel, in accordance with systems and methods consistent with the present invention. The display unit includes an I/O (Input/Output) interface 402 for receiving messages from and sending messages to another display unit or the controller, a central processing unit (CPU) 406, read only memory (ROM) 404, random access memory (RAM) 416, a clock 410, a timer 412, output drivers 408, and a display output device 414. In one embodiment, CPU 406, ROM 404, and RAM 416 can be combined in a single integrated circuit such as a microcontroller, for example Atmel AVR Microcontroller. The I/O interface 402 can be implemented as RS232C Transceivers, timer 412 can be implemented as a microcontroller supervisory circuit, and clock 410 can be implemented as a crystal oscillator or ceramic resonator. CPU 406 executes instructions associated with display unit software stored in ROM 404. The display unit software includes instructions that, when executed, perform all of the functions associated with operating the display unit. CPU 406 communicates with the other subsystems of the display unit over a high speed interconnect or bus 418. RAM 416 stores sets of display data (or frames) received from the I/O interface 402. When CPU 406 receives an instruction to refresh the display, CPU 406 processes the frame stored in RAM 416 and sends the process data to output drivers 408, which refresh display output device 414. Display output device 414 can be any visual display such as an LED matrix, a liquid crystal display, or a plasma display. In other embodiments, the display unit can have additional memory and/or logic for storing a unique address for identification to the controller.

Figure 5:
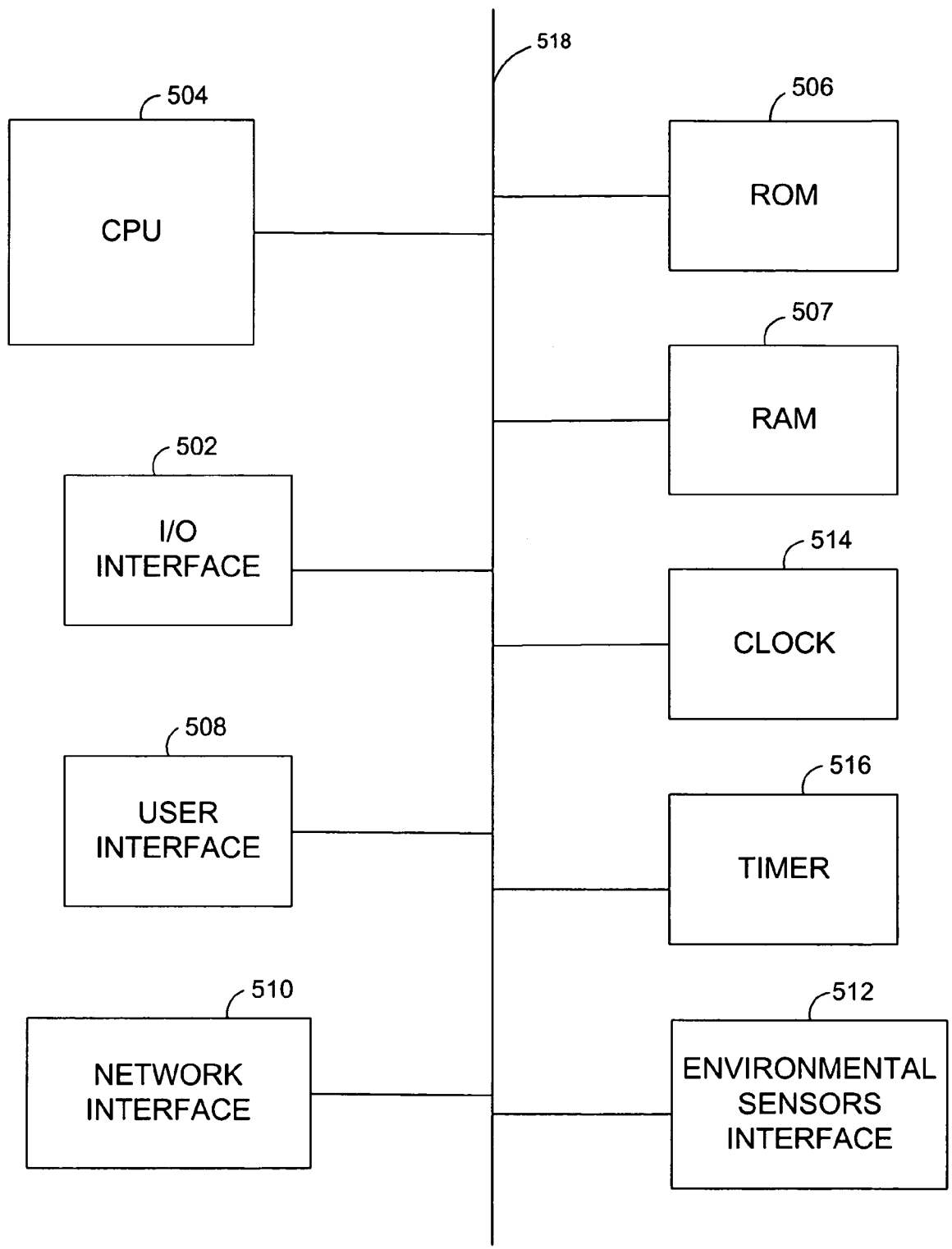
FIG. 5 depicts a block diagram of an exemplary controller, in accordance with systems and methods consistent the present invention.

FIG. 5 depicts a block diagram of an exemplary controller, in accordance with systems and methods consistent the present invention. The controller includes an I/O interface 502 for receiving data from and sending data to the display units, a central processing unit (CPU) 504, a read only memory (ROM) 506, a random access memory (RAM) 507, a user interface 508, a network interface 510, an environment sensors interface 512, a clock 514, and a timer 516. In one embodiment, CPU 504, ROM 506, and RAM 507 can be combined in a single integrated circuit such as a microcontroller. CPU 504 executes instructions associated with controller software stored in ROM 506 and transmits results to other subsystems over a high speed interconnect or data bus 518. The controller software includes instructions that, when executed, perform functions associated with operating the controller. User interface 508 is an interface for coupling the controller with devices such as a keyboard, a mouse, a display device, and any other I/O device useful in operating and managing the controller as is understood by one of skill in the art. Network interface 510 communicates with a remote computer over a network (not shown). The network can be any data communications network including a combination of networks including the Internet, corporate intranets, and other networks compatible with a networking protocol such as TCP/IP. The controller receives input from a user through the user interface 508 and/or network interface 510. RAM 507 can store information received from a user. Environment sensors interface 512 communicates with environment sensors (not shown) that detect aspects of the environment of the sign display panel such as temperature, sunlight, or wind speed. The controller can adjust various aspects of the display according to information received through the environment sensors interface 512.

In this embodiment, the controller can transmit three types of messages: a global message, a local message, and a communication integrity message. Global messages and local messages can be used to send data to each display unit, and to instruct each display unit to update its display. Communication integrity messages can be used to detect errors in the communication network.

A global message does not include an address and should be executed by each display unit that receives it. An example of a global message is a message to refresh the display. A global message is typically a single instruction byte that is executed by the display unit and then sent to the next display unit or, in the case of the final display unit in the network, back to the controller. Thus, referring to FIG. 2, controller 114 sends the global message to the display unit 102. The display unit 102 receives the message from controller 114, executes the message, and sends the message to the next display unit. Accordingly, each display unit 110 receives the message from the previous display unit in the network, processes it, and sends it to the next display unit until the message has returned to controller 114.

A local message should be executed by a specific display unit. For example, local messages typically can be used to provide each display unit with frames to display. A local message typically consists of an instruction byte, an address byte, and may also include one or more data bytes. Before executing a local message, each display unit checks the address byte. In this embodiment, if the address is 0, the display unit executes the instruction. If the address is not 0, the display unit decrements the address and sends the message to the next display unit in the network. When the message is received by the appropriate display unit, the address will be 0 and that display unit will execute the message. In this embodiment, the address byte is an integer from 0 to N−1, where N is the total number of display units. For example, referring to FIG. 2, if the address is 0, display unit 102 will execute the message. If the address is 1, display unit 102 will decrement the address and send the message to the next display unit, which will execute the message because the address will be 0. Likewise, if the address is 2, display unit 102 will decrement the address, send the message to the next display unit, which will also decrement the address, and send the message to the next display unit, which will execute the message.

The controller can also transmit a third type of message called a communication integrity message. The communication integrity message typically consists of a single byte that is sent to each display unit. Typically, the controller sends a communication integrity message to a display unit adjacent to it in the network, and each display unit sends it to the adjacent display unit in the network unit the message is received again by the controller. Thus, the communication integrity message, in one embodiment, is a single byte instructing each display unit to send it to the next display unit or back to the controller.

Using the addressing system associated with local messages, the controller or the interconnect unit can determine the total number of display units in a sign display panel. For example, referring to FIG. 1, interconnect unit 112 can send a local message having any address value greater than the total number of display units. Each display unit can decrement the address value and pass the message to the next display unit. When the address value returns to interconnect unit 112 from the final display unit in the panel, the address will be equal to the initial address less the total number of display units. Thus, interconnect unit 112 can determine the total number of display units by subtracting the returned address value from the initial address value. Similarly, interconnect unit 112 can determine the total number of display units in each row by reading each address value returned to interconnect unit 112 from the final display unit in each row.

Figure 6:
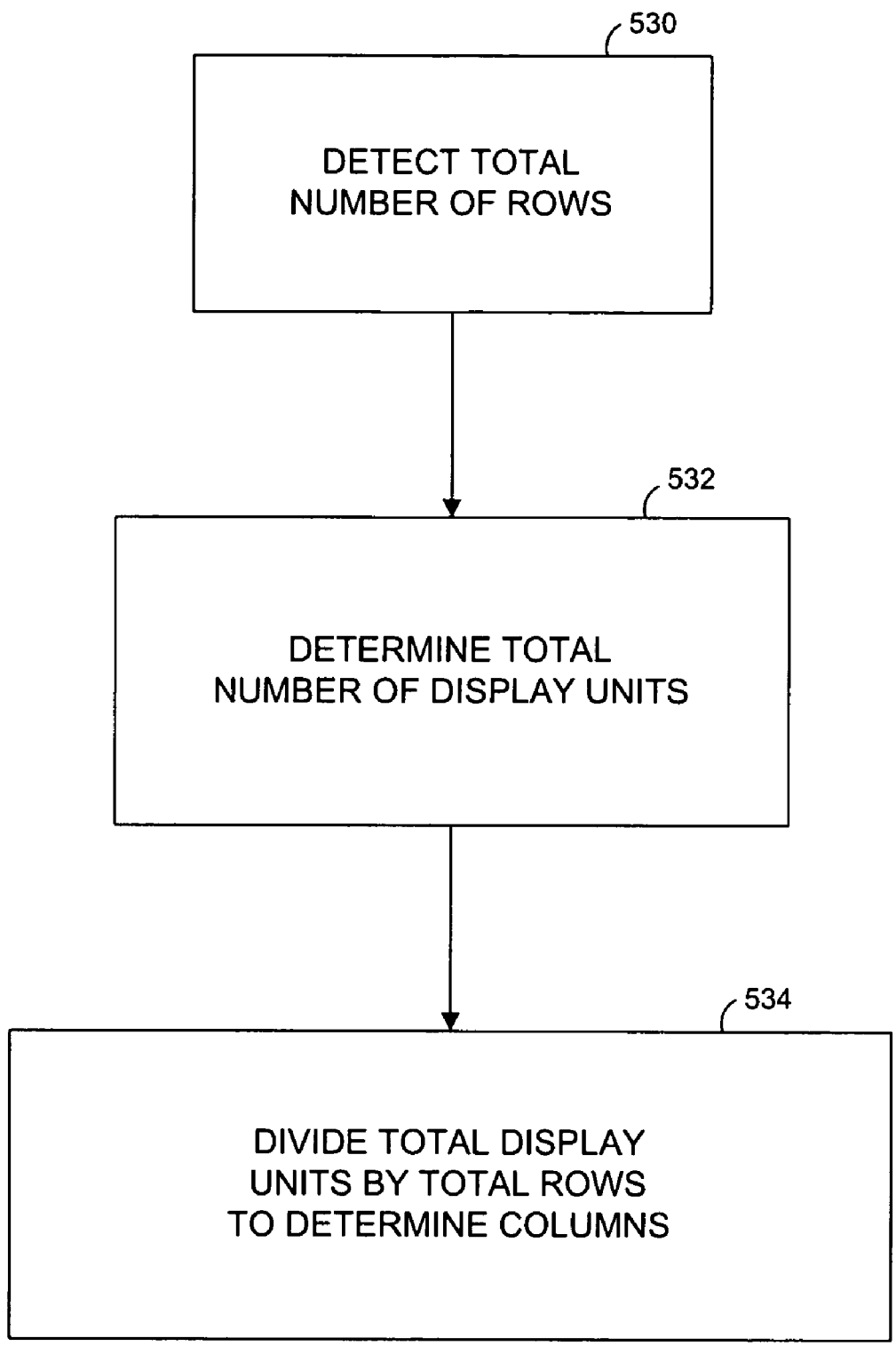
FIG. 6 depicts a flow diagram of an embodiment of a method for automatic sign configuration, in accordance with methods and systems consistent with the present invention.

Referring to FIG. 6, there is shown a flow diagram depicting a method for automatic sign configuration, in accordance with methods and systems consistent with the present invention. The sign configuration, in one embodiment, can be a matrix of display units having a number of rows and a number of columns. As described above with reference to FIGS. 3A and 3B, the interconnect unit includes software for polling each connection port 304a–304c to determine the presence of a connector. In this way, the interconnect unit can detect (step 530) the total number of rows of the display units because each row corresponds to a connector. The interconnect unit can determine (step 532) the total number of display units by sending a local message to each display unit as described above. Each display unit decrements the address value and the CPU 306 can receive the address value from the final display unit connection port after the address value has been decremented by each display unit. CPU 306, executing instructions from software stored in memory 308, subtracts the address value received from the final display unit connection port from the initial address value to determine the total number of display units.

Thus, assuming the sign display panel is a matrix where each row includes the same number of display units, the interconnect unit or the controller can determine the number of columns in the matrix by dividing (step 534) the total number of display units by the total number of rows. For example, referring to FIG. 1, if interconnect unit 112 determines the total number of display units 110 is 25 and that 5 rows are occupied, the sign display panel must be a 5×5 matrix of display units. Accordingly, controller 114 can receive the configuration of the sign from the interconnect unit 112 without user input. In other embodiments, controller 112 can determine the total number of display units and, therefore, the controller 112 can automatically determine the configuration of the sign display panel based on the number of occupied rows received from interconnect unit 112.

Figure 7:
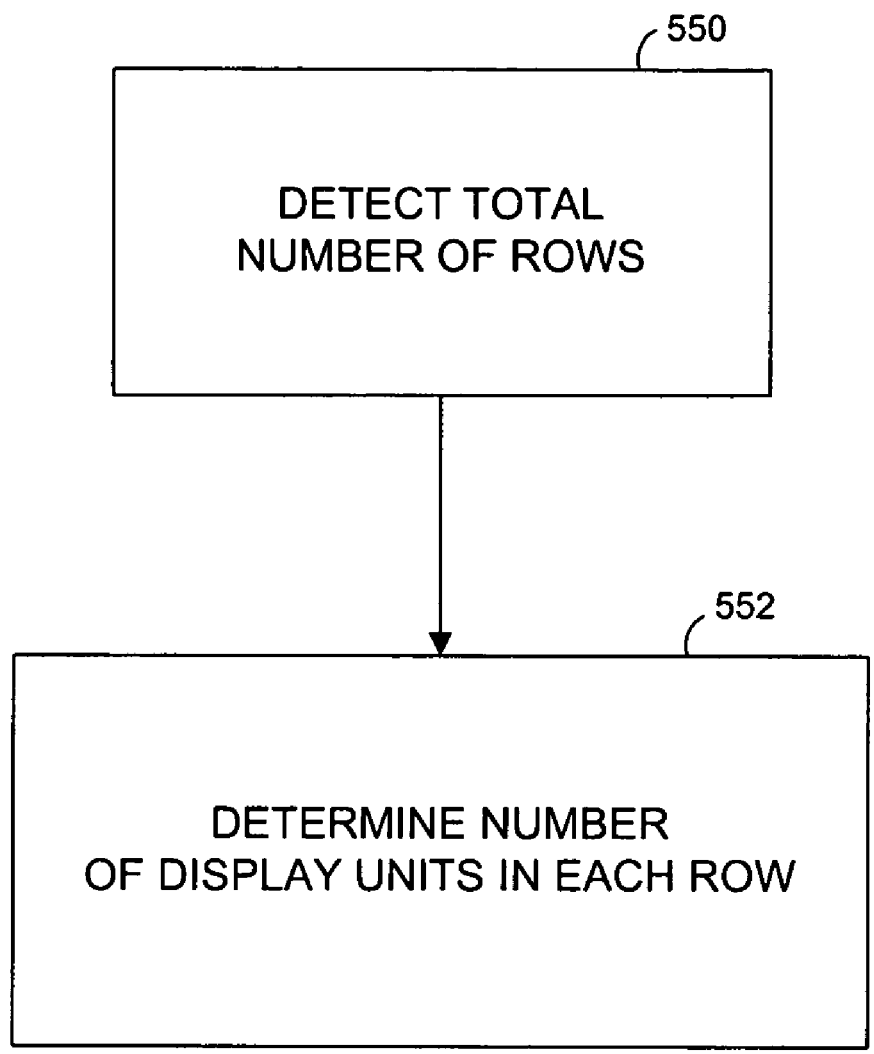
FIG. 7 depicts a flow diagram of another embodiment of a method for automatic sign configuration, in accordance with methods and systems consistent with the present invention.

Referring to FIG. 7, in another embodiment, the interconnect unit can determine the configuration of the sign display panel by polling the connection ports to detect (step 550) each row as described above, and then determining (step 552) the total number of display units corresponding to each row. Referring to the interconnect unit depicted in FIG. 3A, CPU 306 can receive the address value from each display unit connection port after the address value has been decremented by the display units in the previous row. CPU 306, executing instructions from software stored in memory 308, can subtract each such address value from the address value corresponding to the previous display unit connection port. For example, display unit connection port 304b returns an address value to CPU 306 after the address value has been decremented by each display unit in the row corresponding to display unit connection port 304a. CPU 306 can subtract the address value returned from display unit connection port 304b from the initial address value to determine the total number of display units in the row of display units corresponding to display unit connection port 304a. Similarly, CPU 306 can subtract the address value returned from display unit connection port 304c from the address value returned from display unit connection port 304b to determine the number of display units in the row corresponding to display unit connection port 304b. In this embodiment, the interconnect unit can send the controller configuration information consisting of the number of rows and the number of display units corresponding to each row.

Figure 8:
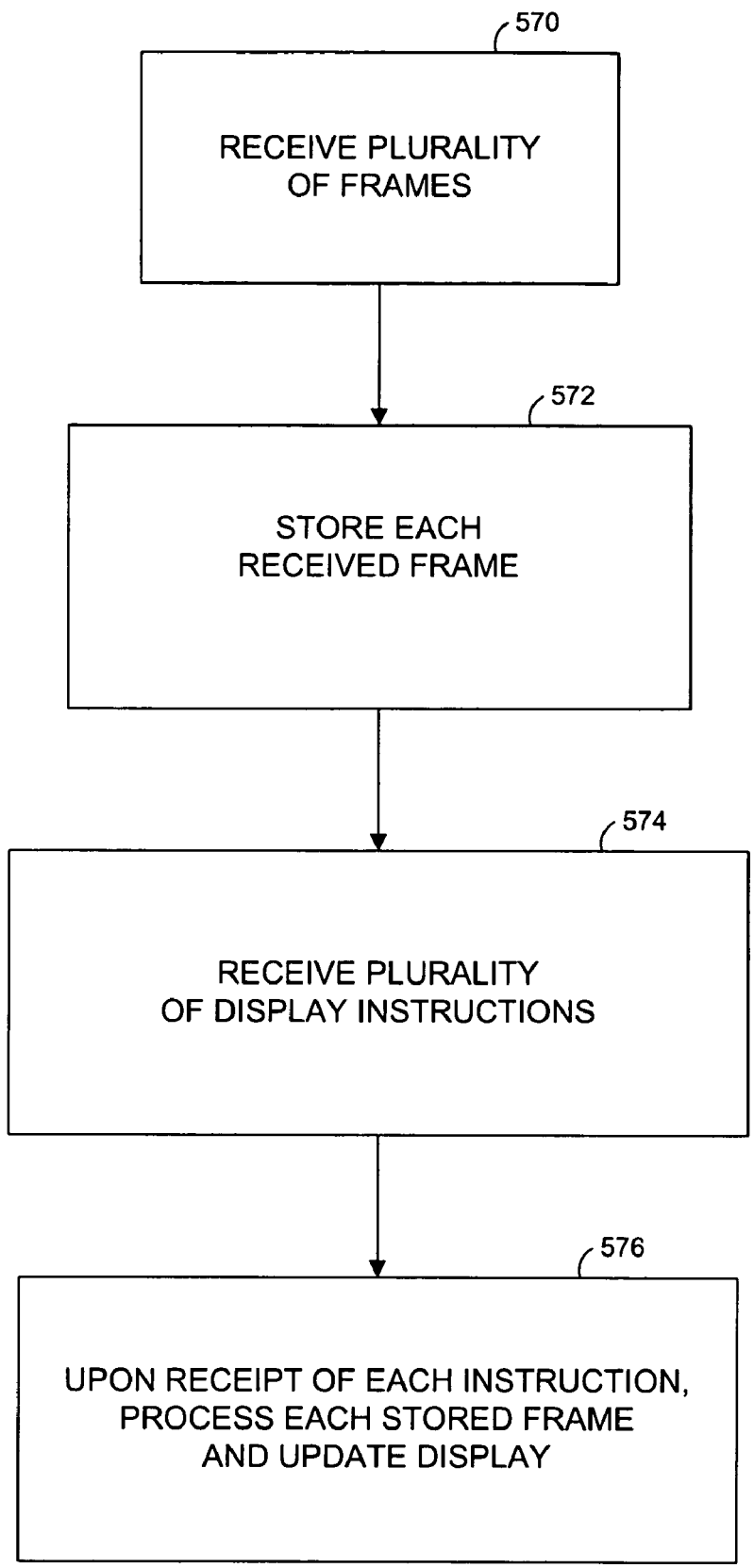
FIG. 8 depicts a flow diagram of a method for rapidly refreshing a sign display panel, in accordance with methods and systems consistent the present invention.

Using local messages and global messages, a sign display panel can rapidly refresh itself. FIG. 8 depicts a flow diagram of a method for rapidly refreshing a sign display panel, in accordance with methods and systems consistent with the present invention. FIG. 8 is described with reference to the block diagram of a display unit depicted in FIG. 4. Local messages can be used to provide each display unit with sets of display data, or frames, to display. A frame is typically eight bytes. A frame includes bytes of data that are processed by the CPU 406 to instruct output drivers 408 to update the display unit device 414. Output drivers 408 can be, in one embodiment, a series of switches that control a simple display output device 414, such as an LED display. More complex output drivers 408 can be used to control a more sophisticated display output device 414, as is understood by those of skill in the art. Accordingly, the local message can include one or more frames along with an instruction to store each frame. In one embodiment, each frame also includes a frame identifier, which can be a byte of data such as an integer, that identifies it for subsequent processing. A display unit can receive the local message that has been addressed to it as described above. The CPU 406 executes the local message and stores each received frame in RAM 416, which can be large enough to store multiple frames. Thus, each display unit can receive (step 570) a plurality of local messages, each containing one or more frames, and store (step 572) each frame in RAM 416. RAM 416, in one embodiment, can be a standard first-in-first-out (FIFO) memory.

The controller can then send a plurality of global messages, which are received (step 574) by each display unit in series, instructing each display unit to refresh display output device 414 using the frames in RAM 416. A display instruction can be a single byte of data that is received by the display unit. The display instruction, when executed by CPU 406, instructs the display unit to process one of the frames in RAM 416. In one embodiment, the display instruction also includes a second byte of data corresponding to the frame identifier. For example, the second byte of data can be an integer that corresponds to the integer identifying the frame. The CPU 406 compares the display instruction integer to each frame identifier for each frame stored in RAM 416 and then processes (step 576) the corresponding frame. In another embodiment, the display instruction instructs the display unit to process the first available frame in RAM 416. In response to each display instruction, CPU 406 processes (step 576) the frame in RAM 416 identified by the display instruction and sends the results to the output drivers 408, which update display output device 414. Thus, each display unit can rapidly refresh its display without the delay associated with the controller sending additional frames before sending the instruction to refresh the display.

Communication integrity messages are used to determine the communication status of the communication network. Referring to FIG. 2, controller 114 can periodically send a communication integrity message to display unit 102. If the controller 114 does not receive the communication integrity message back from display unit 108 within a certain amount of time such as, in one embodiment, 7 seconds, the controller's timer 516 (FIG. 5) sends an interrupt to its processor. Moreover, in this embodiment, each display unit can be programmed to send an error message if it does not receive a communication integrity message for a specified amount of time. Each display unit includes a timer 412 (FIG. 4) that sends an interrupt when the communication integrity message has not been received after a set period of time such as, in one embodiment, 5 seconds. The interrupt causes the display unit to send an error message to the next display unit or the controller. The error message can include an integer, which is decremented by each display unit that receives it until it is received by the controller. In this way, the controller can recognize which display unit first detected the communication error.

For example, turning to the diagram of FIG. 2, consider a sign in which there are two rows and two columns of display units. Thus, the network consists only of controller 114 and display units 102, 104, 106, and 108. If there is a communication error between display units 102 and 104, display unit 104 sends an error message to display unit 106 when it has not received a communication integrity message after the specified amount of time. The error message can include any integer greater than or equal to N−1, where N is the total number of display units. In this embodiment, the controller 114 must be programmed with N or any number greater than N. Thus, in this example, the integer must be greater than or equal to 3. Display unit 106 decrements the integer and sends it to the next display unit. Each display unit that receives the error message decrements the integer. Thus, controller 114 receives the error message including the integer. In this example, the integer has been reduced by 2. Controller 114 can recognize that because the integer has been reduced by 2, display unit 104, the third to last display unit, must have sent the error message. Thus, controller 114 can recognize the communication error between display units 102 and 104.

Communication errors may be due to certain temporary conditions such as a temporary nearby electrical field, or the presence of water inside one of the display units. Thus, when controller 114 recognizes a communication error, controller 114 may perform a diagnostic by resetting the display unit that is causing the error. If the communication error still exists, controller 114 can shut down the display unit and restart. If the communication error still exists, controller 114 can shut down the display unit, wait a period of time such as an hour, and then restart. If the communication error is still not resolved, controller 114 can be operated in a supervisory mode that allows a user to test each display unit to determine the cause of the communication error. Additional diagnostic utilities can be undertaken as is understood by those skilled in the art. Because, in this embodiment, each display unit can report errors detected from a previous display unit in the communication network, the error checking method does not depend upon the malfunctioning display unit and is, therefore, reliable.

Figure 9:
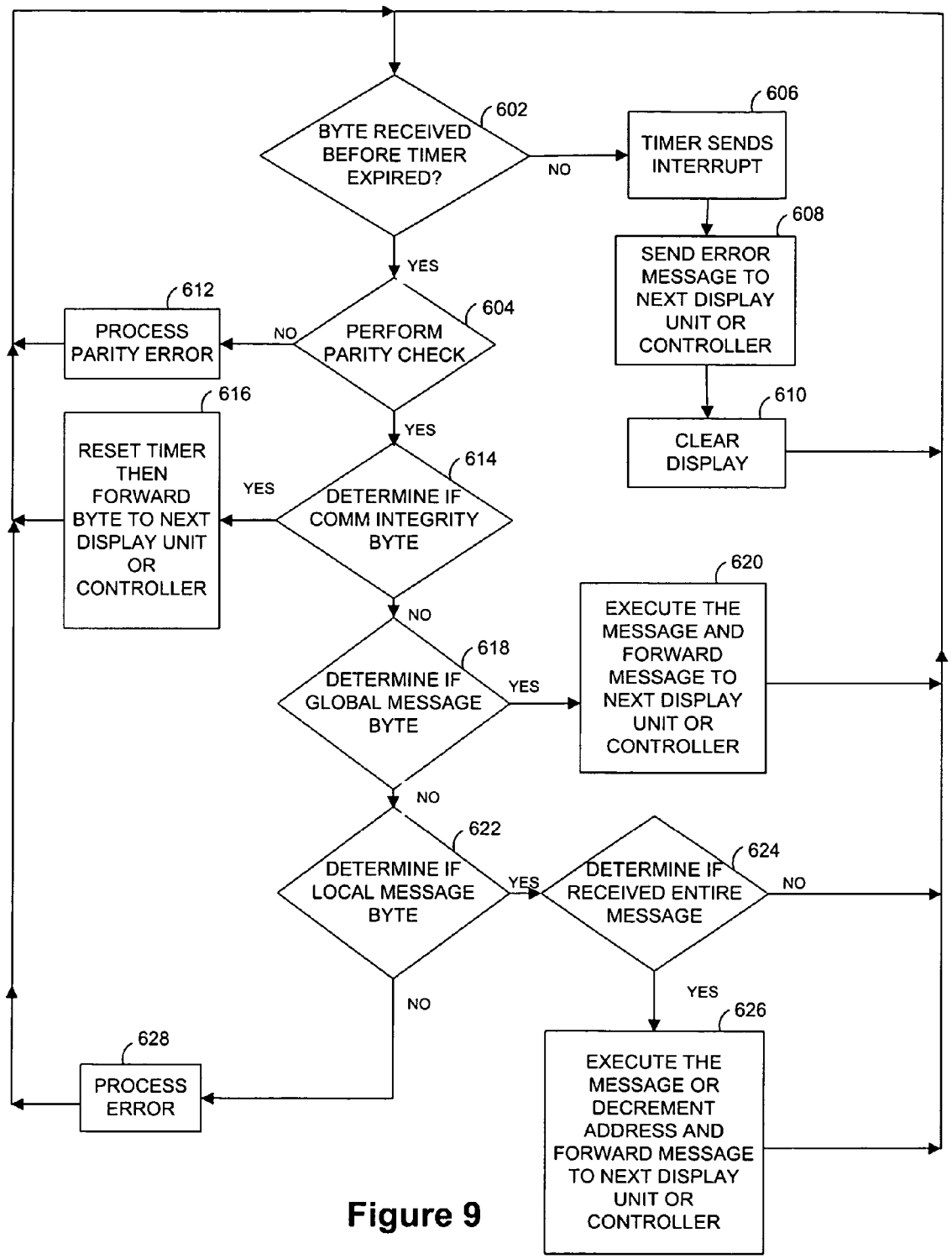
FIG. 9 depicts a flow diagram of a method for error checking in an exemplary sign display panel communication network, in accordance with methods and systems consistent with the present invention.

Referring to FIG. 9, there is shown a flow diagram of a method for error checking in an exemplary sign display panel communication network, in accordance with methods and systems consistent with the present invention. The flow diagram will be described with reference to the block diagram of a display unit depicted in FIG. 4. First, the display unit waits (step 602) to receive a byte from another display unit or the controller. If the byte is not received before timer 412 expires, timer 412 sends (step 606) an interrupt to CPU 406. Timer 412 can be set to expire after 7 seconds in one embodiment, and is reset when the display unit receives a communication integrity message as described below. Upon receiving the interrupt, CPU 406 sends (step 608) an error message to the next display unit or to the controller, and CPU 406 can instruct output drivers 408 to clear (step 610) the display output device 414. An error message is typically a global message instructing each display unit to clear its display output device.

If the byte is received before timer 412 has expired, CPU 406 performs (step 604) a parity check on the received byte. As is understood by one of skill in the art, the parity check can be even or odd parity. Each byte includes a parity bit, and CPU 406 checks the byte to determine if its parity matches the parity bit. If the received byte fails the parity check (i.e. the parity of the byte does not match the parity bit), CPU 406 processes (step 612) the parity error. Processing the parity error can include disposing of the data, instructing the output drivers 408 to clear the display output device 414, and sending an error message to the next display unit or the controller.

If the received byte does not fail the parity check, CPU 406 determines (step 614) if the byte is a communication integrity message. In one embodiment, the community message byte includes a bit that is set if the byte is a communication integrity message. CPU 406 checks this bit to determine if the received byte is a communication integrity message. If the byte is a communication integrity message, CPU 406 resets (step 616) timer 412 to, in one embodiment, 7 seconds and forwards (step 616) the byte to the next display unit or to the controller.

If the byte is not a communication integrity message, CPU 406 determines (step 618) if the byte is a global message. In one embodiment, the byte includes a bit that is set if the byte is a global message. CPU 406 checks this bit to determine if the byte is a global message. If the byte is a global message, the CPU 406 executes (step 620) the global message instruction and sends the byte to the next display unit or the controller.

If the byte is not a global message, CPU 406 determines (step 622) if the byte is part of a local message (i.e. a local instruction byte, an address byte, or a data byte). In one embodiment, the byte includes a bit that is set if the byte is part of a local message. CPU 406 checks this bit to determine if the byte is part of a local message. If the byte is a local message byte, CPU 406 determines (step 624) if it has received the entire message. If not, CPU 406 waits (step 602) to receive additional bytes. If CPU 406 determines it has received the entire message, CPU 406 executes (step 626) the message if the address byte is 0. If the address byte is not 0, CPU 406 decrements (step 626) the address byte and forwards the message to the next display unit.

If the byte is not part of a local message, a global message, or a communication integrity message an error has occurred and the CPU 406 must process (step 628) the error. This can include instructing output drivers 408 to clear display unit device 414, and sending an error message to the next display unit or the controller.

As is understood, the error detection protocol of the present invention can be incorporated with a sign panel configuration consisting of any number of display units. Also, the error detection protocol of the present invention can be incorporated into virtually any sign communication system. For example, the error detection protocol can be incorporated into a communication system in which each display unit is assigned an individual address. In this embodiment, each display unit can perform an error check of the information received from the controller and send error messages back to the controller if an error is detected. Also, the controller can send communication integrity messages to each display unit, and each display unit can send an error message back to the controller if the communication integrity message is not received within a specified period of time.

What is claimed is:

1. A display unit configured for use in a sign display panel, the display unit comprising:
 a memory;
 a display output device;
 an interface configured to communicate with a controller of the sign display; and
 a central processing unit configured to:
  receive, through the interface, one or more messages of a first type, the one or more messages of the first type communicating multiple frames of display data;
  store a plurality of the received frames in the memory upon receipt;
  receive, through the interface, a message of a second type containing a display instruction, the display instruction instructing the display unit to display one frame of the stored frames; and
  process the one frame to update the display output device upon receipt of the display instruction;
 wherein the first message type is a local message containing an address for a particular display unit; and
 wherein the interface is configured to connect the display unit between a controller and an other display unit in series, and wherein the display unit is configured to, upon receipt of a local message:
  check the address; and
  if the display unit is not the particular unit:
   decrement the address; and
   send the local message, with the decremented address, to the other display unit.

2. The display unit of claim 1, wherein the second type of message is a global message.

3. The display unit of claim 1, wherein the display unit is further configured to identify the one frame from among the stored frames based on the display instruction.

4. The display unit of claim 3, wherein the display unit is further configured to identify the one frame based on a frame identifier contained in the display instruction.

5. The display unit of claim 1, wherein the memory comprises a first-in-first-out memory and, upon receipt of the display instruction, the display unit is further configured to display the next frame stored in the memory.

6. A method of rapidly refreshing a sign display panel, the sign display panel comprising: a controller; a plurality of display units, each display unit respectively comprising a display output device and a memory; and an interface configured to communicate messages from the controller to the display units, the method comprising:
   the controller sending multiple frames of display data to the display units through the interface, the frames being contained in one or more messages of a first type;
   the display units respectively receiving and storing a plurality of the frames in memory upon receipt;
   the controller sending a display instruction to the display units through the interface, the display instruction instructing the display units to display one frame of the stored frames, the display instruction being contained in a message of a second type;
   the display units respectively receiving the display instruction; and
   the display units respectively processing the one frame to update the display output device upon receipt of the display instruction.

7. The method of claim 6, wherein the first message type is a local message containing an address for a particular display unit.

8. The method of claim 7, wherein the display units include a first display unit and a next display unit connected in series and wherein, upon receipt of a local message, the first display unit:
   checks the address; and
   if the first display unit is not the particular unit:
      decrements the address; and
      sends the local message, with the decremented address, to the next display unit.

9. The method of claim 6, wherein the second type of message is a global message.

10. The method of claim 6, wherein the display instruction identifies the one frame from among the stored frames.

11. The method of claim 10, wherein each frame comprises a frame identifier, and the display instruction identifies the one frame by the frame identifier.

12. The method of claim 6, wherein the memory comprises a first-in-first-out memory and, upon receipt of the display instruction, the display units display the next frame stored in the memory of the respective display unit.

13. A system for rapidly refreshing a sign display panel, the system comprising:
   a sign display panel comprising:
      a controller;
      a plurality of display units, each display unit respectively comprising a display output device and a memory; and
      an interface configured to communicate messages from the controller to the display units;
   wherein, the controller is configured to:
      send multiple frames of display data to the display units through the interface, the frames being contained in one or more messages of a first type; and
      send a display instruction to the display units through the interface, the display instruction instructing the display units to display one frame of the stored frames, the display instruction being contained in a message of a second type; and
   each display unit is respectively configured to:
      store a plurality of the frames in memory upon receipt;
      receive the display instruction; and
      process the one frame to update the display output device upon receipt of the display instruction.

14. The system of claim 13, wherein the first message type is a local message containing an address for a particular display unit.

15. The system of claim 14, wherein the display units include a first display unit and a next display unit connected in series and wherein the first display unit is configured to, upon receipt of a local message:
   check the address; and
   if the first display unit is not the particular unit:
      decrement the address; and
      send the local message, with the decremented address, to the next display unit.

16. The system of claim 13, wherein the second type of message is a global message.

17. The system of claim 13, wherein the display instruction identifies the one frame from among the stored frames.

18. The system of claim 17, wherein each frame comprises a frame identifier, and the display instruction identifies the one frame by the frame identifier.

19. The system of claim 13, wherein the memory comprises a first-in-first-out memory and, upon receipt of the display instruction, the display units display the next frame stored in the memory of the respective display unit.

* * * * *

UNITED STATES PATENT AND TRADEMARK OFFICE
CERTIFICATE OF CORRECTION

PATENT NO. : 7,053,862 B2  
APPLICATION NO. : 10/752833  
DATED : May 30, 2006  
INVENTOR(S) : Zerphy et al.

Page 1 of 1

It is certified that error appears in the above-identified patent and that said Letters Patent is hereby corrected as shown below:

On the title page item [76], "Bryron L. Zerphy," should be --Byron L. Zerphy.--

Signed and Sealed this

Twelfth Day of September, 2006

JON W. DUDAS  
*Director of the United States Patent and Trademark Office*